United States Patent [19]
Sieben

[11] 3,802,014
[45] Apr. 9, 1974

[54] SAFETY MECHANISM IN THE DRIVE OF AN EJECTOR PIN, ESPECIALLY OF A BOLT PRESS, FOR GUARDING AGAINST OVERLOAD

[75] Inventor: Karl Heinrich Sieben, Wuppertal-Ronsdorf, Germany

[73] Assignee: Gebr. Hilgeland, Wuppertal, Germany

[22] Filed: July 17, 1972

[21] Appl. No.: 272,544

[30] Foreign Application Priority Data
July 15, 1971 Germany............................ 2135404

[52] U.S. Cl. ................................................ 10/23
[51] Int. Cl. ............................................ B21k 1/46
[58] Field of Search............... 10/11 R, 12 R, 15, 23; 64/28, 30 R, 30 A, 30 D

[56] References Cited
UNITED STATES PATENTS
| | | | |
|---|---|---|---|
| 444,460 | 1/1891 | Seaton | 10/23 |
| 1,652,352 | 12/1927 | Georg | 10/23 |
| 1,803,992 | 5/1931 | Bauck | 10/23 |
| 3,238,761 | 3/1966 | Hoyt | 10/23 |

FOREIGN PATENTS OR APPLICATIONS
| | | |
|---|---|---|
| 43,507 | 12/1965 | Germany |
| 219,937 | 7/1961 | Austria |
| 559,684 | 9/1932 | Germany |

Primary Examiner—Charles W. Lanham
Assistant Examiner—E. M. Combs
Attorney, Agent, or Firm—Walter Becker

[57] ABSTRACT

A safety mechanism in the drive of an ejector pin, especially of a bolt press, for guarding against overload, according to which the ejector pin comprises two serially arranged and axially aligned sections having their adjacent ends respectively form a plug and a socket with a breakable plate interposed therebetween so as to normally prevent the plug end from entering the socket end, said breakable plate being adapted in response to the ejector pin being subjected to excessive stresses to break thereby permitting the plug end to enter the socket end.

5 Claims, 2 Drawing Figures

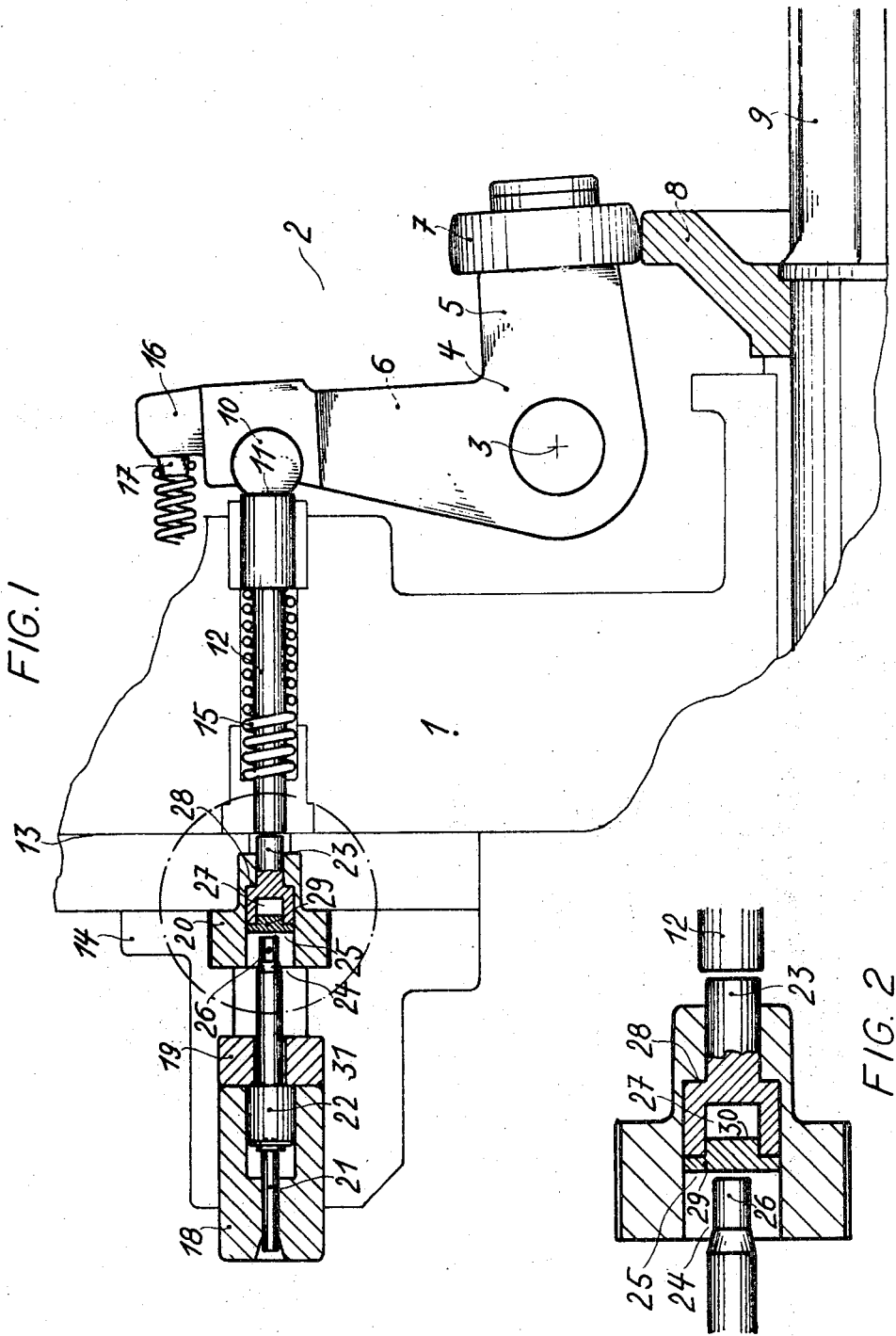

SAFETY MECHANISM IN THE DRIVE OF AN EJECTOR PIN, ESPECIALLY OF A BOLT PRESS, FOR GUARDING AGAINST OVERLOAD

The present invention relates to a safety mechanism for preventing overloads in the drive of an ejector pin provided for a punch or matrix of a bolt press or the like. Such mechanical safety devices against overload in the drive of an ejector pin of an ejecting device on a bolt press are known. A safety device of this kind is described, for instance, in German Auslegeschrift No. 1,652,860. The safety mechanism described in this Auslegeschrift consists of a breakable plate which is located at one end of an arm which controls the ejector pin and oscillates back and forth. In order to be able by means of this breakable safety plate to meet the desired safety requirements, it is necessary that the respective end of this arm be fork-shaped while guiding means are formed for a pressure member one end of which engages the breakable plate whereas the other end engages a bolt which is displaceably arranged in the arm, an intermediate lever of the ejector device engaging the bolt. Such a device requires a considerable number of elements and, therefore, is expensive.

It is an object of the present invention to provide an improved safety mechanism of the general character involved which is technically simple and very economical while assuring fully satisfactory safety.

This object and other objects and advantages of the invention will appear more clearly from the following specification in connection with the accompanying drawing, in which:

FIG. 1 illustrates partly in view and partly in section a safety device according to the invention.

FIG. 2 illustrates on a larger scale that portion of FIG. 1 which is located within the dot-dash circle of FIG. 1.

The safety device according to the invention is characterized primarily in that the ejector pin comprises two serially arranged parts while between the adjacent ends of these parts there is arranged a breakable plate which is displaceably guided in the direction of ejection, the said ends being so designed that one end of one of the two parts is able to enter into the end of the other part after the breakage of said plate.

This safety mechanism can be realized with a relatively small number of elements. It is merely necessary to design the ejector pin provided for the punch or matrix with at least two parts while designing the adjacent ends of the two parts in a special way. In order to obtain identical cross sectional conditions for the power transfer, an at least partial increase in the diameter of the guiding means for the ejector pin or the end of one part of the ejector pin will become necessary.

According to a further development of the present invention, the respective end of one part of the ejector pin has a bore whereas the respective end of the other part has a pin the diameter of which is slightly less than the diameter of the bore. In this instance, in case of the destruction of the breakable plate, a disc-shaped portion is punched out or sheared out of the plate. The forces necessary for this punching or shearing action for destroying the plate can be predetermined with relatively great precision. Such a predetermining would not be possible if, for instance, the stud or pin on one part of the ejector pin would have a considerably smaller diameter than the diameter of the bore in the other part. By employing this feature, it is thus possible precisely to determine the load limit at which the safety mechanism is to become effective.

With bolt presses equipped with an ejector pin for the punch of a punch carrier reciprocable on a press carriage, it is expedient, according to a further feature of the invention, that the respective end of one part which pertains to the ejector pin and faces the press carriage is pot-shaped while a collar is formed which when the ejector pin occupies the end position opposite to the ejecting position engages a collar provided in the punch. In this way the possible movement of this part of the ejector pin in the direction toward the press carriage is limited so that that end of this part of the ejector pin which faces away from the breakable plate cannot move beyond the separating plane between the movable punch carriage and the press carriage into the region of the press carriage whereby otherwise damage could entail. Furthermore, in this way it will be assured that both parts of the divided ejector pin are easily accessible from the end face of the press carriage or punch carrier. This is important with respect to a saving in time during a necessary change of the parts of the ejector pin. However, it is also possible to provide the safety mechanism according to the invention for an ejector pin located on the punch side not in the punch carrier but within the press carriage proper. For the above mentioned reasons, however, such a design is not expedient.

According to another feature of the invention that part which, when looking in the direction of ejection, is located behind the breakable plate has a collar by means of which this part will during a pressing operation rest against a collar located in the guiding means for the ejector pin while relieving the breakable plate. In this way the safety mechanism according to the invention has to be dimensioned only for the transfer of the forces occurring during the ejection operation and does not have to be dimensioned, in contrast to the heretofore known device, for absorbing the forces occurring during a pressing operation.

According to a still further feature of the invention it is advantageous to firmly connect the breakable plate to that part of the ejector pin which comprises the bore. This connection may be effected by means of a pin-shaped extension on the breakable plate which extension partially extends into this bore. Furthermore, the diameter of the breakable plate is adapted to the guiding means for the respective part of the ejector pin. This will bring about that the breakable plate is in a predetermined manner held and guided in the punch or the matrix. On the other hand, in view of the possible destruction of the breakable plate, a shearing or wedging effect brought about by the extension is exerted upon the breakable plate which shearing or wedging effect originates in that part of the ejector pin which comprises the bore. This will likewise contribute to the possibility of precisely determining the load limit of the breakable plate.

Referring now to the drawing in detail, the arrangement shown therein comprises a press carriage 1 of a bolt press. In the press carriage 1 there is provided an ejector mechanism generally designated with the reference numeral 2 which comprises an angle lever 4 with arms 5 and 6, which lever is pivotable about an axis 3. Journalled on the arm 5 is a caliber roll 7 which moves on a cam 8. The cam or cam disc 8 is fastened to a profile wedge shaft 9 which is rotatably journalled in the press carriage 1, the shaft 9 being shown only partially.

Provided at the free end of arm 6 of the angle lever 4 is a bolt 10 with a flattened portion 11 which bolt is rotatable about an axis which is parallel to the axis 3. The flattened portion 11 engages one end of a control pin 12 which may be considered as a part of the entire ejector pin and which is displaceably guided in the press carriage 1. The other end of the control pin 12 extends into the range of the separating plane 13 between the end face of the press carriage 1 and that side of the punch carrier 14 which faces toward the end face of the press carriage 1.

The punch carrier 14 is, in a manner not illustrated in the drawing but set forth in the copending application Ser. No. 271,242 filed July 13, 1972, journalled on the end face of the press carriage so as to be pivotable transverse to the direction of movement of the press carriage 1. The control pin 12 is biased by a pressure spring 15 which keeps the control pin 12 in contact with the angle lever 4. Furthermore the angle lever 4 has the free end of arm 6 provided with an extension 16 with a pivot or pin 17 against which rests a pressure spring journalled in the press carriage but not illustrated fully. This pressure spring is intended to always keep the caliber roll 7 in contact with the cam disc 8.

Exchangeable or removable inserts 18, 19 and 20 are arranged in the punch carrier 14. Parts 21, 22 and 23 of the ejector pin are longitudinally displaceably guided in the inserts 18, 19 and 20 respectively. Divided ejector pins are known per se. In the present invention, the particular design of the respective adjacent ends of parts 22 and 23 of the ejector pin is important.

The end 24 of part 22 has a pin or stud 26 the diameter of which is preferably only slightly less than the diameter of the bore 27 which is provided in the end 25 of the part 23 of the ejector pin. The end 25 of part 23 is preferably pot-shaped while forming a collar 28 by means of which part 23, when the ejector pin occupies an end position, rests against a collar provided in the insert 20 but not further indicated.

Between the stud 26 of part 22 and the end 25 of part 23 there is provided a breakable plate 29 which is fastened in part 23 by means of a stud-like extension 30 the diameter of which corresponds to the diameter of the bore provided in the end 25 of part 23. The breakable plate 29 represents a safety means against overloads which can be simply realized and nevertheless is safe as to its function. It is possible to replace the breakable plate in a minimum of time by another corresponding plate in case the plate has to be replaced as a result of its destruction due to overload in the drive of the ejector mechanism, or to change the load limit if this should be expedient for certain manufacturing processes.

The portion of part 22 which, when looking in the ejecting direction, is located behind the breakable plate 29 has a collar 31 through the intervention of which the part 22 rests during a pressing operation against a collar which is provided in the guiding means for the ejector pin or for the part 22. This last mentioned collar is in the embodiment illustrated in the drawing formed by the insert 19. Since between the breakable plate 29 and the adjacent end 24 of part 22 during a pressing operation there prevails a certain distance of, for instance, 0.5 mm, the breakable plate is relieved during a pressing operation.

It is, of course, to be understood that the present invention is, by no means, limited to the particular showing in the drawing but also comprises any modifications within the scope of the appended claims.

What I claim is:

1. In combination with a bolt press: an ejector pin movable reciprocally from a retracted position in an ejecting direction to an ejecting position at the end of its ejection stroke and vice versa and including two serially arranged and axially aligned sections having their adjacent ends respectively provided with aligned plug and a socket members, and a breakable plate interposed between said adjacent ends so as to normally prevent said plug end from entering said socket end, said breakable plate being constructed to break in response to said ejector pin being subjected to excessive ejection stresses thereby permitting said plug end to enter said socket end and thus prevent damage to said ejector pin and jamming of the press.

2. An arrangement in combination according to claim 1, in which said socket forming end has an axial bore, and in which said plug forming end includes a pin having a diameter only slightly less than the inner diameter of said bore.

3. An arrangement in combination according to claim 1, in which said bolt press includes a punch carrier and insert means exchangeably mounted in said punch carrier and provided with a collar, and in which said socket forming end is pot-shaped and has a shoulder for abutment with said collar when said ejector pin has reached its ejecting position.

4. An arrangement in combination according to claim 3, in which said insert means includes a guiding member for guiding that section of said ejector pin which in the ejecting direction of said ejector pin forms the front portion thereof, and in which that portion of said last mentioned ejector pin section which, in the ejecting direction of said ejector pin, is located in front of said guiding member and has a collar for normally resting against said guiding member during an ejection stroke of said ejector pin while normally keeping the free plug end slightly spaced from said breakable plate.

5. An arrangement in combination according to claim 3, in which the breakable plate is fixedly connected to said socket forming end of the respective ejector pin section by means of a stud-shaped protrusion forming part of said plate and extending into said socket forming end, and in which said insert means includes a guiding member having a guiding bore corresponding to the outer diameter of said socket forming end and the outer diameter of said breakable plate for guiding the latter and said socket forming end.

* * * * *